(12) United States Patent
Caruba et al.

(10) Patent No.: US 8,735,836 B2
(45) Date of Patent: May 27, 2014

(54) POSITRON EMISSION TOMOGRAPHY BLOCK DETECTOR INTERCONNECT

(75) Inventors: James Frank Caruba, Bartlett, IL (US); Niraj K Doshi, Knoxville, TN (US); John W Young, Knoxville, TN (US); Nan Zhang, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 449 days.

(21) Appl. No.: 13/229,797

(22) Filed: Sep. 12, 2011

(65) Prior Publication Data

US 2013/0062525 A1    Mar. 14, 2013

(51) Int. Cl.
*G01T 1/164* (2006.01)

(52) U.S. Cl.
USPC .................................... 250/363.03

(58) Field of Classification Search
CPC .... G01T 1/2985; G01T 1/1644; A61B 6/037; G06F 3/023; H04N 21/43615; H04N 7/108; H04L 12/10
USPC .................................... 250/363.03
See application file for complete search history.

(56) References Cited

U.S. PATENT DOCUMENTS

| | | | |
|---|---|---|---|
| 5,677,536 A * | 10/1997 | Vickers | 250/363.09 |
| 2007/0223518 A1 | 9/2007 | Sanpitak | |
| 2010/0006763 A1 * | 1/2010 | Lentering et al. | 250/366 |
| 2010/0314939 A1 * | 12/2010 | Apfel | 307/31 |
| 2011/0079722 A1 | 4/2011 | Gagnon | |
| 2011/0079723 A1 | 4/2011 | Gagnon et al. | |
| 2011/0172503 A1 | 7/2011 | Knepper et al. | |
| 2011/0172791 A1 | 7/2011 | Hala et al. | |

OTHER PUBLICATIONS

Yaqiang Liu et al., Abstract, "A gain-programmable transit-time-stable and temperature-stable PMT Voltage divider," IEEE Xplore Digital Library, Oct. 2004.
Chao Wang et al., Abstract, "A study of transit time variation in the PMT with a gain programmable voltage divider for a TOF PET," IEEE Xplore Digital Library, Oct. 2010.
Maxim Medical Solutions "Positron emission tomography (PET) imaging," www.maxim-ic.com/medical, pp. 1-8, printed Jul. 26, 2011.

* cited by examiner

*Primary Examiner* — David Porta
*Assistant Examiner* — Mindy Vu
(74) *Attorney, Agent, or Firm* — Peter Kendall

(57) ABSTRACT

Using standard or "off the shelf" cable to interconnect between the PET block detector and the detector circuit may save substantial costs given the number of PMTs in a PET system. Given space constraints, simple maintenance with reduced risk of disturbing cabling is desired, making ongoing use of standard cabling without adding further cabling desired. To implement digital gain control, a further communication is provided between the PET detector block and the detector circuit. Since the standard cable may not have additional wires for such communications and to reduce timing degradation, the PMT signals are combined, such as generating position and energy signals at the PET detector block. The four PMT signals are reduced to three signals without reduction in function, allowing a fourth twisted pair of wires in a CAT5 cable to be used for digital gain control.

16 Claims, 1 Drawing Sheet

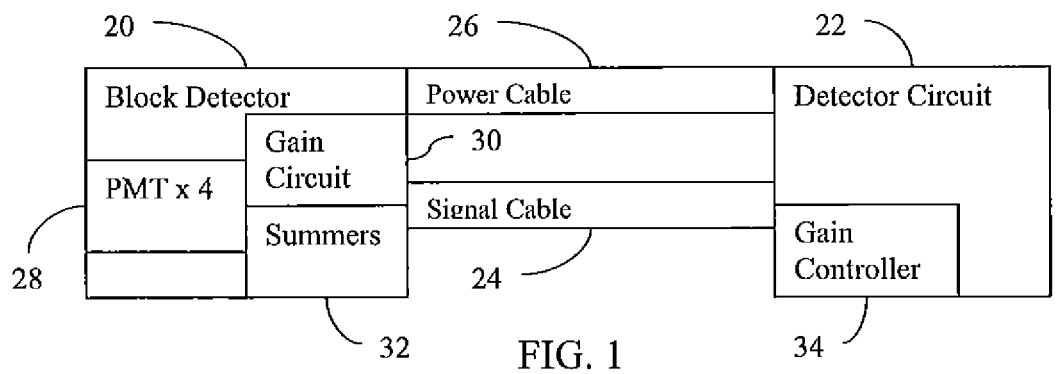
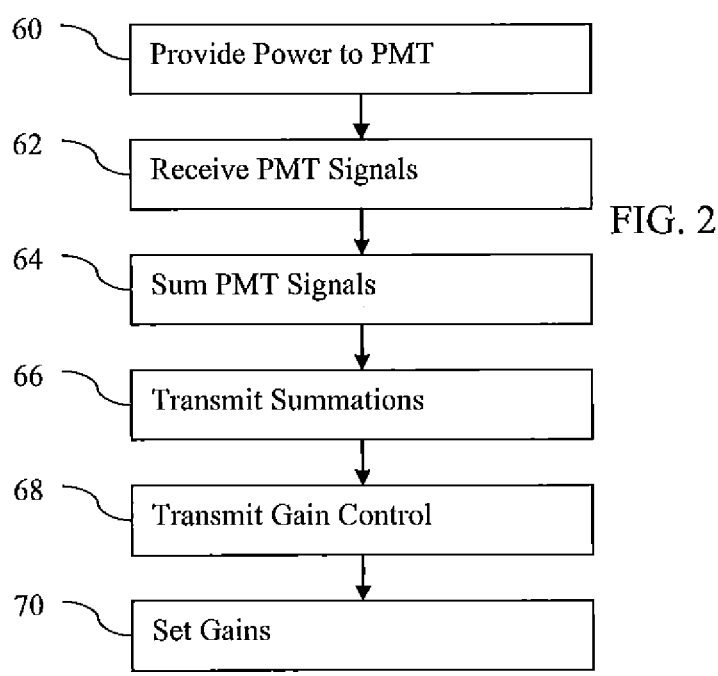

POSITRON EMISSION TOMOGRAPHY BLOCK DETECTOR INTERCONNECT

BACKGROUND

The present embodiments relate to an interconnect for a block detector of a positron emission tomography (PET) system.

Photomultiplier tubes (PMTs) are used in block detectors of PET systems. The PMTs detect light generated by scintillation crystals. For example, four PMTs detect light generated by an array of crystals. Four signals are generated. The signals from the PMTs are communicated over a cable, such as category 5 (CAT5) cable, to a detector circuit for signal processing, event discrimination, and time stamping. Due to the different amounts of twist for different pairs of wires in CAT5 cable, timing performance of the PET system may be degraded.

The PMTs may not be balanced or uniform, resulting in different signal levels for a same amount of light. Aging of the PMTs may cause changes in the relative signal levels. To better equalize the signal levels, the PMTs are gain adjusted. Analog potentiometers (POTs) adjust the gain of the PMTs in an initial calibration. A variable gain amplifier in the detector circuit may account for signal changes due to aging. However, more effective gain control is desired.

In single photon emission computed tomography (SPECT), the gain for PMTs may be implemented by a bias change of dynodes. The gain is controlled digitally. Printed circuit board, ribbon cable, and flexible circuit interconnect are used for transmitting the digital gain control. However, ribbon cabling may have interference problems and result in difficulty in maintenance.

BRIEF SUMMARY

By way of introduction, the preferred embodiments described below include methods, systems, interconnects, and circuits for a PET block detector. Using standard or "off the shelf" cable to interconnect between the PET block detector and the detector circuit may save substantial costs given the number of PMTs in a PET system. Given space constraints in dealing with hundreds of PMTs, simple maintenance with reduced risk of disturbing cabling is desired. Ongoing use of standard cabling without adding further cabling is desired. To implement digital gain control, a further communication is provided between the PET detector block and the detector circuit. Since the standard cable may not have additional wires for such communications and to reduce timing degradation, the PMT signals are combined, such as generating position and energy signals at the PET detector block. Thus, the four PMT signals are reduced to three signals without reduction in function, allowing a fourth twisted pair of wires to be used for digital gain control.

In a first aspect, an interconnect system is provided for a positron emission tomography (PET) block detector. A plurality of summers is at the PET block detector. The plurality of summers are configured to generate first and second position signals and an energy signal from at least four photo multiplier tube (PMT) signals from a respective at least four PMTs. A detector circuit is configured for event discrimination and time stamping from the first and second position signals and the energy signal output from the summers. A gain circuit is at the PET block detector. The gain circuit is configured to separately set a gain of each PMT of the PET block detector in response to gain control signals. A controller is configured to control the gain circuit with the gain control signals. A cable connects between the PET block detector and the detector circuit. The cable has at least four twisted pairs of wires for the first and second position signals, the energy signal, and the gain signals. The cable is a single cable for transmitting the first and second position signals from the PET block detector to the detector circuit and transmitting the gain control signals from the detector circuit to the PET block detector.

In a second aspect, a method is provided for interconnecting photomultiplier tubes (PMTs) of a positron emission tomography (PET) detector block with detector electronics. Analog radio frequency (RF) signals of a single PET detector block are transmitted on three pairs of wires in a category 5 (CAT5) cable. Digital gain control signals are transmitted to the single PET detector block on a fourth pair of wires in the CAT5 cable. Gains are set independently for the PMTs of the PET detector block in response to the digital gain control signals.

In a third aspect, an interconnect is provided for a positron emission tomography (PET) block detector. A first cable connects with the PET block detector. The first cable has at least first, second, third and fourth twisted pairs of wires, where the first, second, and third twisted pairs are connectable to carry energy and position information, and the fourth twisted pair are connectable to carry digital gain adjustment information. A second cable connects with the PET block detector to carry power for the PET block detector.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a block diagram of one embodiment of an interconnect for a PET block detector; and FIG. 2 is a flow chart diagram of an example embodiment of a method for interconnecting a PET block detector and a detector circuit.

DETAILED DESCRIPTION OF THE DRAWINGS AND PRESENTLY PREFERRED EMBODIMENTS

PET block digital PMT gain adjustment and analog radio frequency (RF) signal transport are accomplished over a single category 5 (CAT5) or other multi-pair of twisted wire cable. Three CAT5 pairs are used to carry the block energy and position information, and the fourth CAT5 pair is used to provide for digital PMT gain adjustment, such using the fourth pair for a serial I²C interface for digital PMT gain adjustment. Currently used CAT5 interconnect architecture may be maintained or continued to be used while adding the capability of digital PMT gain adjustment.

Timing degradation may be reduced or eliminated. By summing the PMT signals into position and energy signals in the block detector, the temporal skew caused by different amounts of twist in the cable is reduced or eliminated. The variable gain amplifiers in the detector circuit may be removed since digital gain adjustment is provided. By controlling gain in the PET block detectors, less or no gain control at the detector circuit is needed.

FIG. 1 shows an interconnect system for a positron emission tomography (PET) block detector 20. The PET block detector 20 is interconnected with the detector circuit 22 by the signal cable 24 and one or more power cables 26. Additional, different, or fewer components may be provided. Only part of the PET system is shown. Other parts of the PET system may include power supplies, communications systems, image processing systems, tomography generation systems, and user interface systems. Any now known or later developed PET imaging system may be used with the interconnect discussed herein. The different components of the interconnect system are located within the PET system.

In one embodiment, 192 PET block detectors 20 and ninety six detector circuits 22 are provided in the PET system. Each detector circuit 22 connects with two PET block detectors 20. Other numbers of block detectors 20, numbers of detector circuits 22, and/or ratios of the two may be provided. The PET block detectors 20 of the PET system are arranged individually or in groups.

The cabling connection between each PET block detector 20 to the detector circuit 22 for that PET block detector 20 is minimized while still using standard cables. Non-standard cables may be used in other embodiments. For each interconnection with a PET block detector 20, separate cables are provided. In alternative embodiments, the power cable 26 may be shared between two or more PET block detectors 20.

The PET block detector 20 includes photomultiplier tubes 28, summers 32, and a gain circuit 30. Additional, different, or fewer components may be provided. For example, scintillation crystals are provided. The scintillation crystals are bismuth germanium oxide, gadolinium oxyorthosilicate, or lutetium oxyorthosilicate crystals, but other crystals may be used. An array of crystals may be provided for one or more PMTs 28. In the embodiment shown in FIG. 1, four PMTs 28 are provided in each PET block detector 20. Other numbers of PMTs 28 may be provided in each block detector 20.

Each PET block detector 20 is in an individual housing, with a plurality of such housings arranged around a patient examination area or in a tube. In other embodiments, more than one PET block detector 20 shares a same housing, but are electrically and/or physically separate from each other (e.g., different crystal arrays, different interconnects, or spatially separated).

The PMTs 28 each generate a signal. Together, the four PMT signals may be labeled A, B, C, and D. These analog RF signals represent the amplitude of the detected light. The relative amplitude indicates the detection location within the array of crystals connected with the PMTs 28 of the block detector 20. Each of the signals is output as a differential signal pair.

The summers 32 are network for combining the signals from the PMTs 28. Rather than communicating the signals from each PMT 28 to the detector circuit 22 over the signal cable 24, the four (or other number) analog signals are combined into a fewer number of signals. In one embodiment, the summers 32 are amplifiers on the PMTs 28. In other embodiments, an analog summing matrix or other summers are provided. One or more summers are provided for each combination to be made, but sequential use of a fewer number of summers may be provided. In alternative embodiments, the combination is by frequency or other multiplexing rather than summing.

Any combination function may be used. In one embodiment, three analog RF signals, two position signals and one energy signal, are generated from the PMT signals. The summers are configured using software, hardware or both to generate the position and energy signals. For example, the two position signals are generated as (A+B) and (A+C), and the energy signal is generated as A+B+C+D. Other position and/or energy functions may be used. The position and energy signals are differential signals.

The position and energy signals (or other combination to reduce the number of wires needed) are transmitted on the signal cable 24. The A, B, C, D, or other PMT specific signals are not transmitted on the signal cable 24. For example, instead of transmitting four PMT signals, three (position and energy) signals are transmitted.

The gain circuit 30 is configured by hardware, software, or hardware and software to separately set a gain of each PMT 28 of the PET block detector 20. The gains are set separately in order to relatively adjust the gain. The separate adjustment may be provided using common signals or control information, such as adjusting the gain for all the signals a same amount for aging but different amounts for calibration.

The gain circuit 30 sets the gain in response to gain control signals. Any signal format may be used, such as the gain control signals corresponding to an amplitude of adjustment or change, a desired total amplitude, instructions to select a specific amplitude, or other control. The gain control signals equalize the performance of the PMTs 28 and/or adjust for aging.

The gain circuit 30 includes a processor, application specific integrated circuit, amplifier, analog-to-digital converter, or other circuit able to receive the gain control signals and set the gain. In one embodiment, the gain control signals are provided in a multi-master serial single-ended computer bus ($I^2C$) format. The gain control signals, as transmitted over the signal cable, are digital. For each of the PMTs, a digital-to-analog converter is configured to change a bias of a dynode in response to the gain control signals. The gain control signals are digital signals converted into analog signals by the digital-to-analog converter. The converted analog signals are at an amplitude set by the digital control signals. The amplitude is a bias level applied to the dynode. Indirect control may be provided, such as processing the gain control signals to then operate an analog output, switch circuitry (e.g., change a voltage divider), or otherwise control the gain.

The detector circuit 22 includes a gain controller 34 or the gain control signals are routed through the detector circuit 22 to use the signal cable 24 of the interconnection. Additional, different, or fewer components may be provided. In one embodiment, the detector circuit 22 performs, using hardware, software, or hardware and software, event discrimination and time stamping. The position signals and the energy signal output from the summers 32 are used for event discrimination and time stamping. Each PET signal is to be quantized and time stamped by the detector circuit 22.

In one embodiment, the detector circuit 22 includes an elliptical filter, an amplifier circuit, and an analog-to-digital converter. A processor determines time stamps for different quantized measurements. Other components may be provided for discriminating events and time stamping from the position and energy signals. In alternative embodiments, the detection circuit performs additional, different or fewer functions. The detector circuit 22 is spaced from the PET block detectors 20, such as being centimeters, meters, or more away.

In one example embodiment, the detector circuit 22 is free of a variable gain amplifier for adjusting the PMT signals. Rather than adjust gain in the detector circuit 22, the gain is adjusted by the gain circuit 30 in the block detector 20.

The gain controller 34 is a processor, application specific integrated circuit, field programmable gate array, digital circuit, analog circuit, look-up table, combinations thereof, or other device for generating the digital gain control signals. In alternative embodiments, the gain control signals are generated and transmitted as analog signals.

The gain controller 34 is configured using software, hardware, or software and hardware to control the gain circuit 30. Based on calibration measurements, other feedback, and/or the level of signals, a gain amount or a change in gain is determined. The gain controller 34 uses the change or amount information to generate gain control signals. The gain control signals represent an amount of change or a setting level for operation of the gain circuit 30.

The gain controller 34 determines the gain to account for differences between the PMTs 28. Due to manufacturing tolerance, installation, environment, or other characteristics, different PMTs 28 may perform differently. The gain is set so that a same amount of light at each PMT 28 results in a same or similar RF signal level output by the PMTs. The gain controller 34 alternatively or additionally determines the gain to account for aging. As PMTs age, the signal level output may decrease for a same light input. To counteract this drift in signal level, the gain may be increased over time.

The signals are transmitted over the signal cable 24. The signal cable 24 is an only cable for the PMT signals and the gain control data, saving space and assisting in maintenance. The signal cable 24 is a single cable for signals between the PET block detector 20 and the detector circuit 22, but other signal cables may be provided in other embodiments. Where variable gain is performed at the PET block detector 20, the total number of cables may be reduced or less where both gain control and PMT signals are on one cable.

The signal cable 24 is a category 5 (CAT5) cable. Four twisted pairs of wires are arranged in one sheath. This one cable may provide for transmission of four differential signals. By using standard cabling, costs may be reduced and maintenance more efficient. CAT5 cable may result in less electro-magnetic interference, be more spatially convenient, and be less prone to damage than a ribbon cable. In alternative embodiments, other types of cables may be used, such as a plurality of coaxial cables bundled together, a ribbon cable, CAT6 cable, or other multi-pair cable.

The signal cable 24 is connectable to the PET block detector 20 and the detector circuit 22. Male or female connectors terminate each end of the signal cable 24. The signal cable 24 may be connected and disconnected from the PET block detector 20 and/or the detector circuit 22. In other embodiments, one or both ends of the signal cable 24 are fixedly terminated, such as having wires bonded to a circuit board of the PET block detector 20 and/or detector circuit 22.

The signal cable 24 carries PMT signals. Rather than carrying PMT signals individually from each PMT 28, position and energy PMT signals are carried. The position and energy signals are formed prior to transmission on the signal cable 24 by summation or other combination function. In one embodiment, the signal cable 24 transmits two position signals and one energy signal from the PET block detector 20 to the detector circuit 22. Three of the twisted pair or other conductors of the signal cable 24 carry the PMT information.

The signal cable 24 carries the gain control signals. Rather than using a separate cable for the gain control signals, the signals are transmitted on the signal cable 24. One twisted pair of wires or other conductor carries the gain control signals. Digital information for adjusting the gain is communicated over the signal cable 24.

The signal cable 24 may be the only cable for carrying signals to the PET block detector 20, but one or more power cables 26 may be provided. The power cable 26 may be twisted pair, a wire, or other cable.

The power cable 26 is separate from the signal cable 24. One power cable 26 is provided for each PET block detector 20. The power is daisy chained or otherwise provided to each of the PMTs 28. The same route, holders, or layout may be used for the power cable 26 as the signal cable, but differences may be provided. For example, the power provided over the power cable 26 may be daisy chained between different PET block detectors 20 so that fewer power cables 26 than PET block detectors 20 are provided. In one embodiment, only one power cable 26 is output for high voltage PMT power from each detector circuit 22. All PET block detectors 20 interconnected with the detector circuit 22 connect with the same power cable 26.

The power from the power cable 26 or power from another power cable is used to power the gain circuit 30 and/or the gain communications. For example, a lower power is provided over a separate cable than the high voltage for the PMTs 28. Alternatively, the power with the high voltage for the PMTs 28 is used to power other components of the PET detector block 20, such as powering using a voltage divider.

FIG. 2 shows one embodiment of a method for interconnecting photomultiplier tubes (PMTs) of a positron emission tomography (PET) detector block with detector electronics. The method is implemented using the interconnect system of FIG. 1 or other systems or circuits. The method is performed in the order shown, but other orders may be used. For example, the gain associated acts 68 and 70 are shown after the PMT related acts 62-66, but may be performed before or concurrently. Additional, different, or fewer acts may be provided, such as digital processing, pre-amplification, event discrimination, and/or time stamping.

The acts of FIG. 2 are performed for one or more PET detector blocks. A plurality (e.g., hundreds) of PET detector blocks is arranged in a cylinder or other array to detect positron emission events in a patient. The PMT related acts 62-66 and the gain acts 68-70 are performed for each of the PET detector blocks. Since some PMTs may not detect an emission due to location, the generation and transmission of signals may not occur at the same time. Separate cables for each PET detector block are used for carrying the signals from the PET detector block to the detector circuit.

In act 60, power is provide to PMTs. The PMTs operate with a high voltage. The high voltage is provided to the PMTs from the detector circuit, but may be provided from a different source (e.g., a power supply separate from the detector circuit). The high voltage may be distributed between the PET block detectors around the cylinder or separate power may be routed directly to each PET block detector.

The power is provided over a cable or other conductor of high voltage. The cable is separate from any cables used for signaling, but may be part of a signal cable.

In act 62, PMT signals are received in the single PET detector block. In response to an emission of a pair of gamma rays (photons), arrays of crystals contacted by the gamma rays generate light. PMTs, in response to the light, generate signals. Four PMTs distributed over an array of crystals may each generate analog RF signals for a given burst of light. The generation of the PMT signals is the reception of such signals. The output of the PMTs at the PET detector block receives the signals.

In act 64, the PMT signals are summed. Any combination using a summing function may be used. Combinations without a summing function may be used in other embodiments.

In one embodiment, the summing results in two position signals and one energy signal. For example, A, B, C, and D signals are combined as A+B+C+D as the energy signal and (A+B) and (A+C) as the two position signals. Other combinations with or without normalization or averaging may be provided.

In act 66, the analog RF signals are transmitted from the PET detector block. The summed PMT signals, such as the position and energy signals, are transmitted from the PET detector block to a detector circuit for event discrimination and time stamping. Due to the summing of act 64, three signals are transmitted.

The transmission is along a cable. Three signals are transmitted on different conductors of a same cable (e.g., within a same sheath or cover). For example, the transmission is along three twisted pairs of a CAT5 cable. Using CAT5 cable may keep costs down as PET systems become more commoditized.

In act 68, digital gain control signals are transmitted. The digital gain control signals are transmitted to the PET block detector, such as from the detector electronics or other gain control. The gain control signals are transmitted in any format, such as $I^2C$. The gain control signals are coded to indicate a level or change of gain to be applied in the PET detector block. In alternative embodiments, analog gain control signals are transmitted.

The gain control signals are transmitted on the same cable as the PMT signals. For example, a fourth pair of twisted wires in a CAT5 cable carries the gain control signals. The same, single cable carries both the gain control signals and position/energy signals. Other cables may carry power and/or other signals.

In act 70, the gain for each PMT is set. The gain control signals are received and used to set the gains. Based on calibration, feedback, signal measurements, or other information, the gain for each PMT is determined. The gain control signals represent the desired gain or a change to get to the desired gain. Different PMTs of the same PET block detector may have the same or different gain. The gains are set independently for the different PMTs. The gains may be relative to each other so that similar signal levels are generated for the same light or voltage. Independent setting allows different gains to provide this relative (e.g., dependent) gain.

The gain is set by circuitry. For example, variable amplifiers increase and/or decrease signal amplitude of the PMT signals prior to or after summing. As another example, potentiometers are adjusted. In yet another example, the bias of the dynodes of the PMTs is altered. The bias is an analog signal or direct current signal applied to the dynodes. The gain control signals are digital representations of an analog amplitude. A digital-to-analog converter changes the digital signals to the analog bias signal. Other gain circuits may be used.

The PMT signals are responsive to the gain. The gain corrected PMT signals, such as the position and energy signals, are received by the detector circuit. The detector circuit may filter the signals, such as with an elliptical filter. The energy and position signals are filtered separately. The signals are analog, so the filtering is analog. The signals may be amplified. In one embodiment, variable gain amplification for gain correction is not applied in the detector electronics. The detector electronics convert the signals from an analog format to the digital format. Any sampling may be used. The amplified signals are converted to digital format for time stamping and processing.

The digital information may be time stamped and communicated to a processor. The digital information is processed to detect photons in opposite directions from a same radiation decay event. PET images are generated from the detected energy and position information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. An interconnect system for a positron emission tomography (PET) block detector, the interconnect system comprising:
a plurality of summers at the PET block detector, the plurality of summers configured to generate first and second position signals and an energy signal from at least four photo multiplier tube (PMT) signals from a respective at least four PMTs;
a detector circuit configured for event discrimination and time stamping from the first and second position signals and the energy signal output from the summers;
a gain circuit at the PET block detector, the gain circuit configured to separately set a gain of each PMT of the PET block detector in response to gain control signals;
a controller configured to control the gain circuit with the gain control signals; and
a cable connected between the PET block detector and the detector circuit, the cable comprising at least four twisted pairs of wires for the first and second position signals, the energy signal, and the gain signals, the cable being a single cable for transmitting the first and second position signals from the PET block detector to the detector circuit and transmitting the gain control signals from the detector circuit to the PET block detector.

2. The interconnect system of claim 1 wherein the cable comprises a category 5 (CAT5) cable.

3. The interconnect system of claim 1 wherein the first and second position signals and the energy signals are differential signals.

4. The interconnect system of claim 1 wherein the PMT signals comprise A, B, C, and D signals, and wherein the summers are configured to generate the first position signal as (A+B), the second position signal as (A+C), and the energy signal as A+B+C+D, none of A, B, C, nor D being transmitted on the cable.

5. The interconnect system of claim 1 wherein the summers comprise amplifiers on the PMTs.

6. The interconnect system of claim 1 wherein the gain control signals transmitted in a multi-master serial single-ended computer bus ($I^2C$) format.

7. The interconnect system of claim 1 wherein the detector circuit is free of a variable gain amplifier for adjusting the PMT signals.

8. The interconnect system of claim 1 wherein the gain circuit comprises a digital-to-analog converter configured to change a bias of a dynode of one of the PMTs in response to the gain control signals, the gain control signals as transmitted over the cable being digital.

9. The interconnect system of claim 1 wherein the controller is configured to control the gain circuit to reduce differences between the PMTs.

10. The interconnect system of claim 1 further comprising:
a power cable separate from the cable, the power cable providing power to the PMTs.

11. A method for interconnecting photomultiplier tubes (PMTs) of a positron emission tomography (PET) detector block with detector electronics, the method comprising:
  transmitting analog radio frequency (RF) signals of a single PET detector block on three pairs of wires in a category 5 (CAT5) cable;
  transmitting digital gain control signals to the single PET detector block on a fourth pair of wires in the CAT5 cable; and
  setting gains independently for the PMTS of the PET detector block in response to the digital gain control signals.

12. The method of claim 11 further comprising:
  receiving PMT signals in the single PET detector block;
  summing the PMT signals, the summing resulting in two position signals and one energy signal;
  wherein transmitting the analog RF signals comprises transmitting the two position signals and the one energy signal.

13. The method of claim 11 wherein transmitting the digital gain control signals comprises transmitting in a multi-master serial single-ended computer bus ($I^2C$) format.

14. The method of claim 11 wherein setting the gains comprises changing biases of dynodes of the PMTs.

15. The method of claim 11 wherein the transmitting acts and setting act are performed for each of a plurality of the PET detector blocks, separate single cables being provided for each of the PET detector blocks.

16. The method of claim 11 further comprising:
  providing power to the PMTs on a separate cable than the single cable.

* * * * *